(12) United States Patent
Greco et al.

(10) Patent No.: US 9,341,417 B2
(45) Date of Patent: May 17, 2016

(54) HEAT EXCHANGE MEDIA FOR MANAGING SILICA BUILD-UP IN A REGENERATIVE THERMAL OXIDIZER

(76) Inventors: Richard Greco, Palm City, FL (US); Vinod Kumar Jain, Mandsaur (IN)

( * ) Notice: Subject to any disclaimer, the term of this patent is extended or adjusted under 35 U.S.C. 154(b) by 509 days.

(21) Appl. No.: 13/216,420

(22) Filed: Aug. 24, 2011

(65) Prior Publication Data
US 2011/0303397 A1 Dec. 15, 2011

Related U.S. Application Data

(62) Division of application No. 12/621,656, filed on Nov. 19, 2009, now abandoned.

(60) Provisional application No. 61/116,716, filed on Nov. 21, 2008.

(51) Int. Cl.
| | | |
|---|---|---|
| *F28D 17/02* | (2006.01) | |
| *F23G 7/06* | (2006.01) | |
| *F23L 15/02* | (2006.01) | |
| *F28F 19/02* | (2006.01) | |

(52) U.S. Cl.
CPC .............. *F28D 17/02* (2013.01); *F23G 7/068* (2013.01); *F23L 15/02* (2013.01); *F28F 19/02* (2013.01); *F23L 2900/15021* (2013.01); *Y10T 29/4935* (2015.01); *Y10T 29/49357* (2015.01); *Y10T 29/49377* (2015.01)

(58) Field of Classification Search
CPC ...................................................... F28D 17/02
USPC ................................................ 427/215; 165/4
See application file for complete search history.

(56) References Cited

U.S. PATENT DOCUMENTS

| | | | | |
|---|---|---|---|---|
| 4,059,544 A | * | 11/1977 | Yamaguchi et al. | 502/324 |
| 5,622,551 A | * | 4/1997 | Erbe | C01B 33/26 106/35 |
| 5,731,250 A | * | 3/1998 | Reid | C04B 35/481 501/106 |
| 2007/0155612 A1 | * | 7/2007 | Reid | 501/119 |

OTHER PUBLICATIONS

Galleries.com, Minerals: Feldspar, Webpage, Feb. 5, 1997, Accessed (via internet archive): Aug. 24, 2011, p. 1.*
Ariffin, Feldspathic Minerals, p. 1-16, Jun. 2003.*

* cited by examiner

*Primary Examiner* — Tabatha Penny
(74) *Attorney, Agent, or Firm* — Dickinson Wright PLLC

(57) ABSTRACT

A heat-exchange medium for use in a regenerative thermal oxidizer has a coating of potassium aluminum silicate which prevents the build-up of silicon dioxide from processed gas on the surface of the ceramic heat-exchange media. The ceramic heat-exchange medium has 1% or less by weight of MgO based on the total medium weight and the coating has a thickness of from 0.2 to 0.4 mm. The coating consists of potassium aluminum silicate having a composition of about 4 to 8% by weight K2O, about 26 to 38% by weight Al2O3, and about 52 to 64% by weight SiO2 based on the total coating weight.

13 Claims, No Drawings

HEAT EXCHANGE MEDIA FOR MANAGING SILICA BUILD-UP IN A REGENERATIVE THERMAL OXIDIZER

CROSS REFERENCE TO RELATED APPLICATION

This application is a divisional of U.S. application Ser. No. 12/621,656 for HEAT EXCHANGE MEDIA FOR MANAGING SILICA BUILD-UP IN A REGENERATIVE THERMAL OXIDIZER, filed Nov. 19, 2009, which claims the benefit of U.S. Provisional Patent Application Ser. No. 61/116,716 for HEAT EXCHANGE MEDIA FOR MANAGING SILICA BUILD-UP IN A REGENERATIVE THERMAL OXIDIZER filed on Nov. 19, 2008, which is hereby incorporated by reference in its entirety.

FIELD OF THE INVENTION

The present invention relates generally to ceramic media used in regenerative thermal oxidizers (RTOs) and, more specifically, with preventing the build up of silicon dioxide on such ceramic media.

BACKGROUND OF THE INVENTION

Regenerative thermal oxidizers (RTOs) are used in a number of industries to reduce the quantity of contaminants in process effluent gases. RTOs are unique in their ability to conserve fuel through the use of heat exchangers. In an RTO, the process effluent gases are oxidized in a combustion chamber. As the high-temperature combustion gases move to an exhaust stack, they flow through a heat exchanger, typically a chamber containing ceramic media. In the heat exchanger, up to 95% of the heat is transferred from the gases to the ceramic media. The flow of gases is then reversed such that the inlet process gases move through the heat exchanger toward the combustion chamber. Heat is transferred from the hot ceramic media to the process gases and consequently less energy is required to oxidize the process gases in the combustion chamber.

RTOs are continually subjected to plugging by organic and inorganic particulates. Organic particulates, such as heavy hydrocarbons and cellulose particulates can be readily disposed of with a bake-out feature in a RTO. This bake-out cycle elevates the temperature of the recovery chambers to a point where the organic particulates carbonize and fall away from the heat recovery media. These carbonized particulates are then carried out with the stack exhaust gas.

On the other hand, this is not the case with inorganic particulate such as silica which lodges in the oxidizer. Solid silica coming in as part of the process air stream is not a problem; it passes through the RTO media like fine beach sand. The real problem exists when silicon fume enters the RTO. In passing through the regenerative heat recovery bed, silicon fume is preheated to 95% of the units combustion chamber oxidation temperature, which is usually greater than 1400° F. When silicon laden fume passes through the point in the bed where the temperature is greater than 1292° F. (700° C.), it is oxidized and becomes a solid particulate on the surface of the ceramic media. It is believed that the interface boundary always remains above the original media surface where the original free silicon dioxide resides. In other words, the silica layering builds from the inside out by forming consecutive layers on the original host silica such that new layers are formed under the previously formed layers.

Eventually, depending on the amount of silicon fume present in the process gas, a RTO will become fouled to the point where process flow is choked off completely. Although $SiO_2$ oxidation builds up slower as the RTO oxidation process continues, unfortunately by the time it gets to the nil formation point, most RTOs are incapacitated by insufficient process flow.

Typically, most end users that have the problem of silica build up on ceramic media enter the RTO periodically and try to clean off the silica that has adhered to the ceramic heat recovery media with the use of a high pressure water stream or with the use of compressed air. Some even try to remove the top layers of the media where the silica has adhered, wash it and then replace it. There are as many methods of cleaning and/or maximizing the duration time between replacements of media as there are users with the silica build up problem.

SUMMARY OF THE INVENTION

In one aspect the present invention provides a ceramic heat recovery material for use in a regenerative thermal oxidizer which does not accumulate a build-up of silicon dioxide on its surfaces. The ceramic heat recovery media of the present invention is coated with potassium aluminum silicate prior to firing the media. That is, the clay which is used to make the ceramic media is coated with potassium aluminum silicate and is then fired to make a ceramic media which is resistant to the formation of silica on its surface. In a preferred embodiment, the potassium aluminum silicate has from about 4% to 8% by weight $K_2O$, about 26% to 38% by weight $Al_2O_3$ and about 52% to 64% by weight $SiO_2$.

In another aspect the present invention provides a method of making a ceramic media for a heat-exchanger of a regenerative thermal oxidizer by providing clay; shaping the clay into a plurality of preforms or a monolithic structure suitable for use in a regenerative thermal oxidizer; contacting substantially the entire outer surface of the preforms or monolithic structure with potassium aluminum silicate; and firing the coated performs or monolith to form the ceramic media.

The potassium aluminum silicate coating, it is believed, prevents the formation of silica build-up because all of the silica in the coating is bound.

DETAILED DESCRIPTION OF THE PREFERRED EMBODIMENTS OF THE INVENTION

It has been a common belief that the gaseous silicon converts to solid silica and then lodges in the voids in the RTO media on its course of travel through the hot zones of the RTO. The reason as to why it adheres to the media has become somewhat of a mystery until now.

Without being limited by any theory of operation, it is believed that gaseous silicon carried by the process fume, once elevated beyond about 1292° F. (700° C.) oxidizes and solidifies at the point of contact with free silica located on the surface of the conventional ceramic media. Once oxidized, it is believed that the Si converts to solid $SiO_2$ to form undesired layers of silica on the ceramic heat recovery media. It is believed that this oxidation reaction takes place at the Si—$SiO_2$ interface, that being the surface of the ceramic heat recovery media. Free surface silica ($SiO_2$), not combined with $Al_2O_3$ at the time of firing the ceramic media, provides the silicon dioxide ($SiO_2$) surface on which the incoming silicon gas deposits as silica.

This problem is believed to arise in several contexts (without limiting the full scope of the present invention): coil steel paint coatings high temperature drying oven off-gas containing silicones (polysiloxanes); off-gas from sewage sludge palletizing facilities containing silicones; printing ink fume containing silicones; paint booth fume containing silicones; biogas methane from landfills containing silicones; release agents used in foam peal-back tape manufacture; and fabric dying off-gas containing silicones.

It is believed that the Siloxanes change state and go solid when oxidized above 1300° F. Beyond 1300° F., they adhere to any ceramic structure that contains free silica as part of its manufacturing process that is also above 1300° F.

The silica fume Siloxanes (Si) are carried with the manufacturing process fume entering the RTO or any thermal oxidizer for that matter. The fume containing volatile organic compounds (VOCs), or just noxious odors must be destroyed in an oxidizer. The solid $SiO_2$ in a fine power state is not destroyed and clogs the ceramic media above 1300° F. Accordingly, the ceramic media can occupy the entire heat exchange chamber or only that portion which reaches 1300° F.

The silicones are sometimes added to a manufacturing process as part of the manufacturing process. In the printing or painting industry, silicone is added to the print ink to give the final products sheen. Siloxanes also may be generated by non-intentional occurrences such as the oxidation of fumes emanating from sewage sludge or carried by methane gas from decomposing garbage which must be destroyed in a thermal oxidizer.

So, in effect, the only solid $SiO_2$ which forms is at the point of contact with the free $SiO_2$ on the surface of conventional ceramic media. The solid $SiO_2$ appears to be sticking to the ceramic media, but in reality it is believed it is forming at the point of contact. It is believed that the remainder of the silicon gas is oxidized by the combination of $Si+O_2+$ heat and passes through the RTO as particles of silica. That would explain why one typically does not find $SiO_2$ collecting in the colder portions of the RTO below the 1292° F. mark.

Unfortunately using conventional manufacturing processing for making the ceramic heat recovery media, there is no way to insure 100% combining of the $SiO_2$ with the $Al_2O_3$, which would otherwise eliminate the problem.

It is believed that the way to stop the silicon in the fume from converting to a solid and building up on the "free" silicon dioxide of the ceramic media is to stop the oxidation process at the point of contact between silicon fume and the ceramic media. This can be accomplished by encapsulating the free silica within the sphere (or monolith) of the heat recovery media. Without host silica being exposed to the silica fume oxidation, it is believed that layering of $SiO_2$ at point of contact with silica fume will not occur. To accomplish this result, one must apply a thin coating of potassium aluminum silicate at the time of manufacture of the ceramic media to stop the free silica from acting as a substrate for silica buildup.

Suitable clays for use in making the inventive ceramic heat recovery media which is coated with potassium aluminum silicate prior to firing include, but are not limited to, clays containing $SiO_2$, $Al_2O_3$, $Fe_2O_3$, $TiO_2$, $Na_2O$, $K_2O$, $CaO$, and $MgO$. The concentration (in weight percentage throughout this specification, unless noted otherwise) of these oxides in the clay can vary, but is preferably about 60-75% weight percent $SiO_2$, about 17-30% weight percent $Al_2O_3$, up to about 2% weight percent $Fe_2O_3$, less than about 1% weight percent $TiO_2$, up to about 1% weight percent $Na_2O$, about 2-4% weight percent $K_2O$, up to about 1% weight percent $CaO$, and up to about 1% weight percent $MgO$. Other suitable clays include those having from about 45% to about 48% weight percent $SiO_2$, about 29% to 38% weight percent $Al_2O_3$, and about 1.6% to 2.2% weight percent $K_2O$.

As stated, the potassium aluminum silicate is used to coat a thin coating (from approximately 0.25 to 0.4 mm) on the clay prior to firing the clay to form the ceramic heat exchange media. After firing the coating should be at least about 0.2 mm thick and should substantially cover the entire outer surface of each coated piece of clay or monolith or multilayer ceramic media. The final physical form of the ceramic heat exchange media is not critical and includes saddles, rings, spheres, pellets and monolithic media. These are the preferred near net shapes for making the clay performs which are subsequently contacted with potassium aluminum silicate prior to firing.

The potassium aluminum silicate coating is prepared by comminuting the materials to form particles of approximately between 250 mesh and 300 mesh (U.S. Mesh) and combining with water. As used herein the term "solvent" is used broadly as any liquid in which potassium aluminum silicate can be admixed for application to clay performs. The weight of potassium aluminum silicate which is added to the solvent will typically be between about 90 grams to about 110 grams per 1000 ml of solvent. In the most preferred embodiment, the coating material is present in the solvent at a concentration of from about 200 grams to about 300 grams per 1200 ml of water.

The coating may be applied using any number of techniques including by dipping the clay preforms or monolith in the aqueous coating mixture, spraying the aqueous coating mixture or other means for contacting substantially the entire outer surface of the clay preforms or monolith with the aqueous coating material. It may also be suitable to apply the potassium aluminum silicate as a powder to the clay preforms and an intermediate binder may be useful. It is to be understood that the ceramic media may be in any form.

Following the coating operation, the potassium aluminum silicate coated clay preforms are fired using any number of firing methods, such as being placed in a kiln for approximately 24 hours at a temperature of between about 1200 to 1230° C. In essence the potassium aluminum silicate forms a glazing on the ceramic media.

EXAMPLES

A clay having the following oxides ($Al_2O_3$, $SiO_2$, and $K_2O$) would be used to make clay performs which would be near net shape of the finished ceramic media, for example, a ring-shape structure.

Next, a powder of potassium aluminum silicate would be prepared by comminuting it to form a powder having particles of approximately 250 mesh (U.S. mesh). The powder would then be combined with water. Once the powder is in admixture with the water, the clay performs would be dipped in the aqueous potassium aluminum silicate mixture. Substantially the entire outer surface of the performs would be coated with the potassium aluminum silicate mixture. The coated performs would then be fired in an oven for 24 hours at about 1200° C.

What is claimed is:

1. A shaped ceramic heat-exchange medium for a regenerative thermal oxidizer, said shaped ceramic heat-exchange medium having 1% or less by weight of MgO based on the total medium weight and a glaze coating encapsulating the ceramic heat-exchange medium with said glaze coating having a thickness of from 0.2 to 0.4 mm, and said glaze coating consisting of potassium aluminum silicate having a composition of about 4 to 8% by weight K$_2$O, about 26 to 38% by weight Al$_2$O$_3$, and about 52 to 64% by weight SiO$_2$ based on the total coating weight.

2. The ceramic heat-exchange medium recited in claim 1, wherein said heat-exchange medium is in the shape of a ceramic saddle.

3. The ceramic heat-exchange medium recited in claim 1, wherein said heat-exchange medium is in the shape of a ceramic ring.

4. The ceramic heat-exchange medium recited in claim 1, wherein said heat-exchange medium is in the shape of a ceramic sphere.

5. The ceramic heat-exchange medium recited in claim 1, wherein said heat-exchange medium is in the shape of a ceramic pellet.

6. The ceramic heat-exchange medium recited in claim 1, wherein said heat-exchange medium is in the shape of a monolith.

7. The ceramic heat-exchange medium recited in claim 1, wherein said heat-exchange medium is in the shape of a corrugated layered ceramic media.

8. The ceramic heat-exchange medium recited in claim 1, wherein said heat-exchange medium is in the shape of a layered structured ceramic media.

9. The ceramic heat-exchange medium recited in claim 1, wherein said medium is formed from a clay having from 45 to 48% by weight based on the total weight of SiO$_2$.

10. The ceramic heat-exchange medium recited in claim 1, wherein said medium is formed from a clay having from 29 to 38% by weight based on the total weight of Al$_2$O$_3$.

11. The ceramic heat-exchange medium recited in claim 1, wherein said medium is formed from a clay having from 1.6 to 2.2% by weight based on the total weight of K$_2$O.

12. The ceramic heat-exchange medium recited in claim 1, wherein said medium is formed from a clay having up to 2% by weight based on the total weight of Fe$_2$O$_3$.

13. The ceramic heat-exchange medium recited in claim 1, wherein said glaze coating of potassium aluminum silicate is prepared from particles of potassium aluminum silicate having a particle size of from about 250 U.S. mesh to 300 U.S. mesh.

* * * * *